US012176671B1

(12) United States Patent
Deng et al.

(10) Patent No.: US 12,176,671 B1
(45) Date of Patent: Dec. 24, 2024

(54) ELECTRICIAN PLIERS

(71) Applicants: ZHEJIANG IWISS ELECTRIC CO., LTD., Leqing (CN); Zhuji ITOP Hardware Tools Co., Ltd., Zhuji (CN)

(72) Inventors: Xiaoming Deng, Zhuji (CN); Jiulian Xu, Zhuji (CN)

(73) Assignees: ZHEJIANG IWISS ELECTRIC CO., LTD., Yueging (CN); Zhuji ITOP Hardware Tools Co., Ltd., Zhuji (CN)

( * ) Notice: Subject to any disclaimer, the term of this patent is extended or adjusted under 35 U.S.C. 154(b) by 0 days.

(21) Appl. No.: 18/428,417

(22) Filed: Jan. 31, 2024

(30) Foreign Application Priority Data

Jun. 25, 2023 (CN) ......................... 202321610884.3

(51) Int. Cl.
*H01R 43/048* (2006.01)

(52) U.S. Cl.
CPC ................................ *H01R 43/0488* (2013.01)

(58) Field of Classification Search
CPC ..... B23D 29/023; B25B 27/10; B25B 27/146; B25G 1/043; H01R 43/042
See application file for complete search history.

(56) References Cited

U.S. PATENT DOCUMENTS

| | | | | |
|---|---|---|---|---|
| 1,987,127 | A * | 1/1935 | Rice | H01R 4/16 439/879 |
| 5,168,743 | A * | 12/1992 | Schrader | B25B 7/00 267/155 |
| 5,195,353 | A * | 3/1993 | Erbrick | B25B 27/146 72/409.11 |
| 7,024,911 | B2 * | 4/2006 | Delhumeau | H01R 43/042 81/367 |
| 7,628,052 | B2 * | 12/2009 | Zhang | B25B 27/10 72/413 |
| 2023/0090179 | A1 * | 3/2023 | Shen | B21D 39/046 29/268 |

* cited by examiner

*Primary Examiner* — Minh N Trinh
(74) *Attorney, Agent, or Firm* — Schwegman Lundberg & Woessner, P.A.

(57) ABSTRACT

An electrician plier is provided, it includes a first head and a second head. The first head is provided with a first positioning member and a first rotating disc, and the first rotating disc is connected to the first head, first crimping teeth and first crimping grooves are provided at a periphery of the first rotating disc, first positioning holes are defined on the first rotating disc, and the first positioning member is matched and connected with the first positioning holes. The second head is provided with a second positioning member and a second rotating disc, and the second rotating disc is connected to the second head, and second crimping teeth and second crimping grooves are provided at a periphery of the second rotating disc, and second positioning holes matched and connected with the second positioning holes are defined on the second rotating disc.

11 Claims, 9 Drawing Sheets

ELECTRICIAN PLIERS

CROSS REFERENCE TO RELATED APPLICATION

The present application claims priority to Chinese Application No. 202321610884.3, filed on 25 Jun. 2023, the entire contents of which are hereby incorporated herein by reference.

TECHNICAL FIELD

The disclosure relates to the technical field of power tools, in particular to an electrician plier.

BACKGROUND ART

Crimping connection of cold terminals is a main way to realize power connection. For example, for an electrical power harness in automobiles, one of connecting terminals is connected to a core of a wire, and then a connection part is crimped with an electrician plier, so that the wire can be fixedly connected with the terminal.

An application scene of the electrician plier is not only limited to the power harness of the automobile, but also can be other wiring scenes such as household power distribution and power connection. Change in application scene also puts forward higher requirements for applicability of crimping sizes of the electrician plier'. Although an existing electrician plier is provided with a structure with various crimping sizes, but with complicated operation in adjusting the crimping sizes, which results in inconvenience in using the electrician plier.

SUMMARY

To solve the above problems, the technical scheme provided in the disclosure is as follows.

An electrician plier includes a first handle and a second handle which are hinged with each other. The first handle is movably connected with a first head, the second handle is movably connected with a second head, the first head and the second head are clamped between fixed plates, and a rotating shaft is provided between the first head and the second head. The first head is provided with a first positioning member and a first rotating disc, and the first rotating disc is movably connected to the first head, a plurality of first crimping teeth and a plurality of first crimping grooves are provided at a periphery of the first rotating disc, a plurality of first positioning holes are defined on the first rotating disc, and the first positioning member is matched and connected with the plurality of first positioning holes. The second head is provided with a second positioning member and a second rotating disc, and the second rotating disc is movably connected to the second head, and a plurality of second crimping teeth and a plurality of second crimping grooves are provided at a periphery of the second rotating disc, and a plurality of second positioning holes are defined on the second rotating disc, and the second positioning member is matched and connected with the plurality of second positioning holes. The first rotating disk is arranged opposite to the second rotating disk.

In an embodiment of the disclosure, it is further provided that the first head can include a first connecting cavity and first side plates located at both sides of the first connecting cavity, and the first rotating disc can be movably connected inside the first connecting cavity through a first connecting shaft. The second head can include a second connecting cavity and second side plates located at both sides of the second connecting cavity, and the second rotating disk can be movably connected inside the second connecting cavity through a second connecting shaft.

In an embodiment of the disclosure, it is further provided that the first connecting shaft can penetrate through the first side plates, a first indication mark is provided at an end face of the first connecting shaft, and the first side plates can be provided with first size marks which can be distributed around the first connecting shaft. The second connecting shaft can penetrate through the second side plates, a second indication mark is provided at an end face of the second connecting shaft, and the second side plates can be provided with second size marks which can be distributed around the second connecting shaft.

In an embodiment of the disclosure, it is further provided that the first positioning member includes a first positioning cap, a first return spring and a first top bead, the first positioning cap can be connected to the first side plates, the first return spring can be located in the first positioning cap, one end of the first return spring can be abutted against the first positioning cap, the other end of the first return spring can be abutted against the first top bead, and the first top bead can be connected in the first positioning holes. The second positioning member includes a second positioning cap, a second return spring and a second top bead, the second positioning cap can be connected to the second side plates, the second return spring can be located in the second positioning cap, one end of the second return spring can be abutted against the second positioning cap, the other end of the second return spring can be abutted against the second top bead, and the second top bead can be connected in the second positioning holes.

In an embodiment of the disclosure, it is further provided that the fixing plates can be located at both sides of the first head and the second head, and the first head can be provided with a first fixing post, and the second head can be provided with a second fixing post, and the first fixing post and the second fixing post can respectively penetrate through the fixing plates.

In an embodiment of the disclosure, it is further provided that a first arc groove is provided at a side of the first head proximate to the rotating shaft, and a second arc groove is provided at a side of the second head proximate to the rotating shaft, and the rotating shaft can be attached to the first arc groove and the second arc groove respectively, and the rotating shaft can be located between the fixing plates.

In an embodiment of the disclosure, it is further provided that each of the plurality of first crimping grooves can be arranged between adjacent first crimping teeth, and sizes or shapes of the plurality of first crimping grooves can be different from each other. Each of the plurality of second crimping grooves can be arranged between adjacent second crimping teeth, and sizes or shapes of the plurality of second crimping grooves can be different from each other.

In an embodiment of the disclosure, it is further provided that the first handle can be movably connected with the first head through a first eccentric shaft, and the second handle can be movably connected with the second head through a second eccentric shaft.

In an embodiment of the disclosure, it is further provided that there is at least one group of first positioning members provided, and there is at least one group of second positioning members provided.

In an embodiment of the disclosure, it can be further provided that the first handle and the second handle are movably connected through a pin shaft.

Compared with related art, the technical schemes provided in the disclosure have the following beneficial effects:

For the electrician plier according to the technical scheme of the disclosure, a crimping size of a connecting terminal can be adjusted by: obtaining a size of a crimping part of the connecting terminal, directly shifting the first crimping teeth of the first rotating disk and the second crimping teeth of the second rotating disk, and adjusting the crimping size to a required size according to the first size marks indicated by the first indication mark on the first connecting shaft and the second size marks indicated by the second indication mark on the second connecting shaft, or directly according to experience or in other marking methods. After the adjusting is completed, the wire core and the connecting terminal can be directly placed into a crimping port, and then the first handle and the second handle are closed followed by actions of the first head and the second head, and thus the first rotating disc and the second rotating disc are closed together to complete a crimping action.

For the electrician plier according to the disclosure, the crimping size of the head can be simply and quickly adjusted, so as to improve convenience and flexibility in using the head.

DETAILED DESCRIPTION

Figure 1:
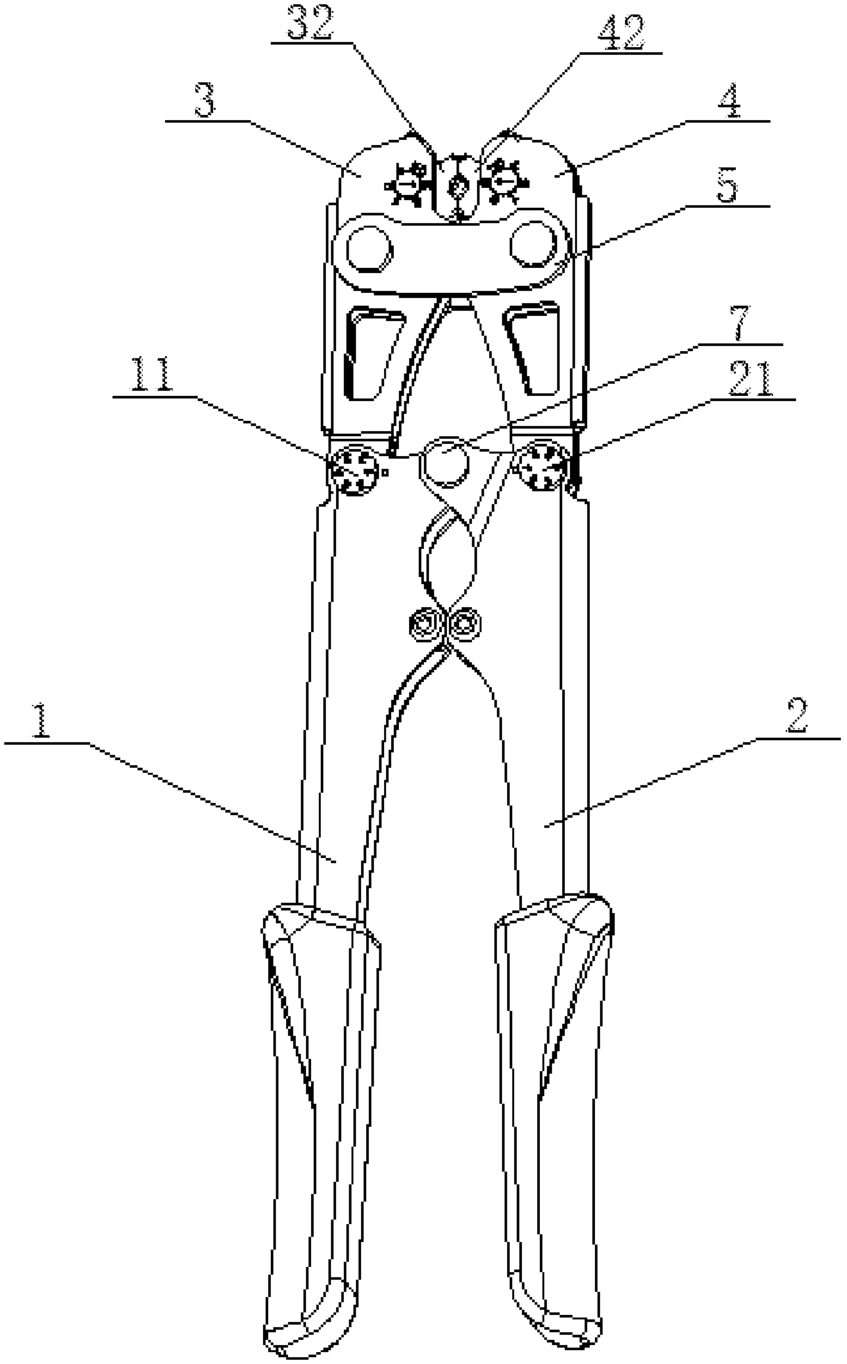
FIG. 1 is a perspective view of an electrician plier in a closed state according to an embodiment of that present disclosure.
Figure 2:
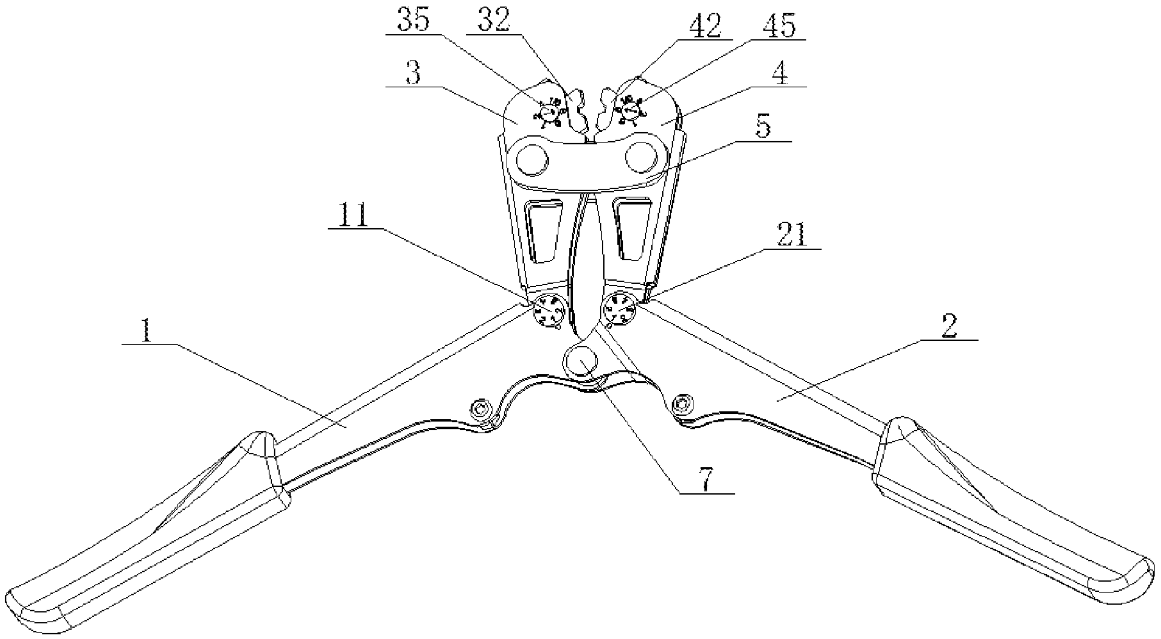
FIG. 2 is a perspective view of an electrician plier in an open state according to an embodiment of the disclosure.

In order to further understand contents of the present disclosure, the present disclosure will be described in detail with reference to drawings and examples.

It should be noted that the embodiments in the present disclosure and the characteristics in the embodiments can be combined mutually in the case of no conflict.

In description of this disclosure, it should be noted that unless otherwise specified and limited, terms “installing”, “coupling” and “connecting” should be understood broadly, for example, it can be “fixedly connecting”, “integrally connecting”, or “detachably connecting”; or it can be “mechanically connecting” or “electrically connecting”, or it can be “communicating within two elements”; or it can be “directly connecting” or “indirectly connecting through an intermediate medium”, and specific meanings of the above terms can be understood according to specific situations for ordinary shilled in the art.

Referring to FIG. 1 to FIG. 7, a technical scheme of the disclosure is an electrician plier (or called power plier), which includes a first handle 1 and a second handle 2 which are hinged with each other. The first handle 1 is movably connected with a first head 3, the second handle 2 is movably connected with a second head 4, the first head 3 and the second head 4 are clamped between fixed plates 5, and a rotating shaft 6 is provided between the first head 3 and the second head 4 so that the first head and the second head can be displaced around the rotating shaft. The first head 3 is provided with a first positioning member 31 and a first rotating disc 32, and the first rotating disc 32 is movably connected to the first head 3, a plurality of first crimping teeth 321 are provided at a periphery of the first rotating disc 32, a plurality of first positioning holes 322 are defined on the first rotating disc 32, and the first positioning member 31 is matched and connected with the plurality of first positioning holes 322. The second head 4 is provided with a second positioning member 41 and a second rotating disc 42, and the second rotating disc 42 is movably connected to the second head 4, and a plurality of second crimping teeth 421 are provided at a periphery of the second rotating disc 42, and a plurality of second positioning holes 422 are defined on the second rotating disc 42, and the second positioning member 41 is matched and connected with the plurality of second positioning holes 422. The first rotating disk 32 is arranged opposite to the second rotating disk 42.

In the above embodiment, the first rotating disc 32 and the second rotating disc 42 are positioned using the first positioning member 31 and the second positioning member 41 respectively, and thus if it is necessary to switch a crimping size between the first rotating disc 32 and the second rotating disc 42, it can be made by directly shifting the first crimping teeth 321 of the first rotating disc 32 and the second crimping teeth 421 of the second rotating disc 42.

Figure 3:
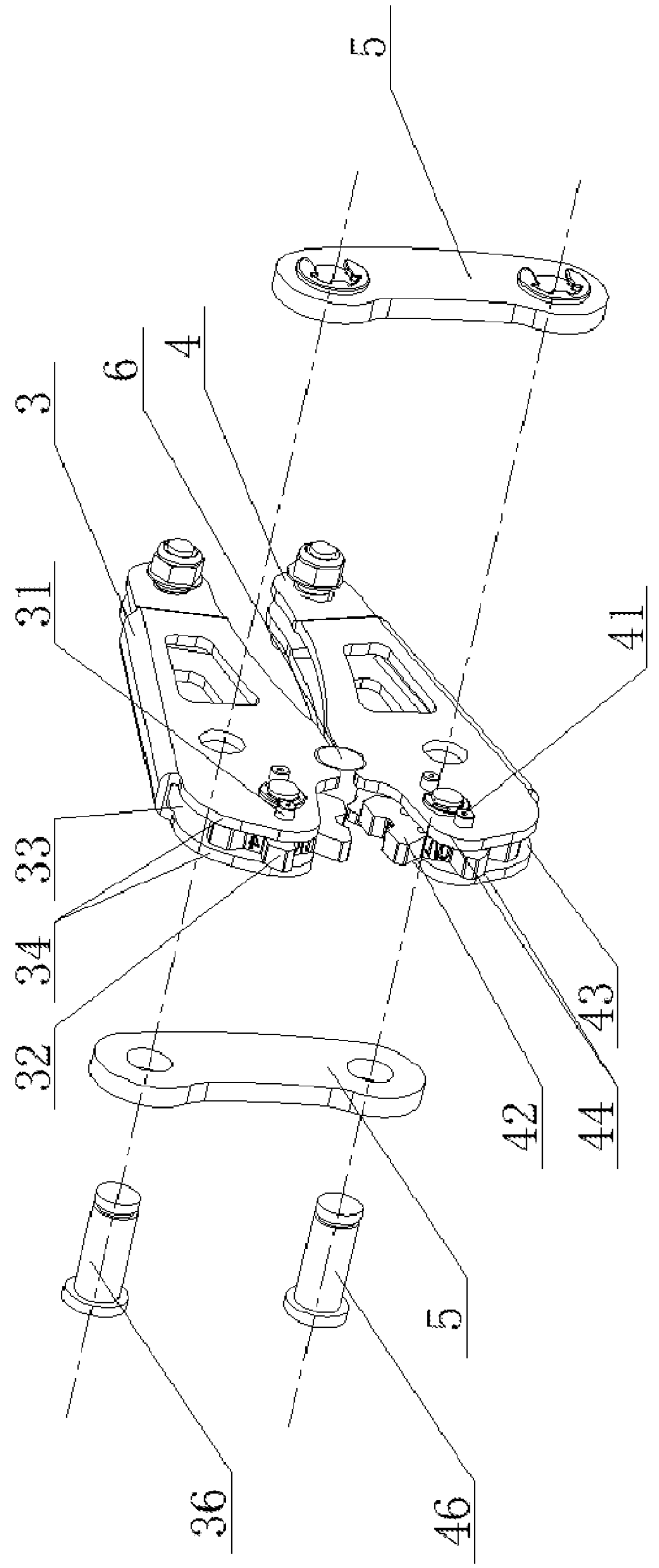
FIG. 3 is an exploded view of a head of an electrician plier according to an embodiment of the disclosure.
Figure 4:
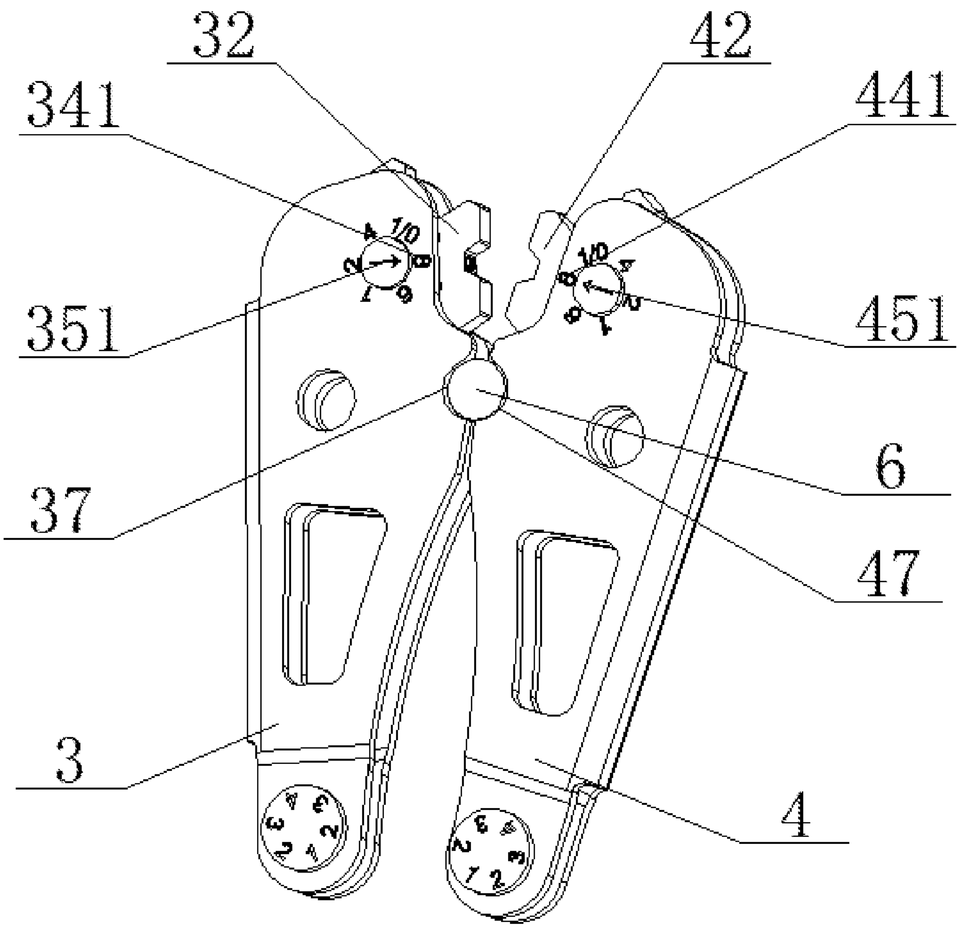
FIG. 4 is a front perspective view of a head of an electrician plier according to an embodiment of the disclosure.

In this embodiment, as shown in FIGS. 3 and 4, the first head 3 includes a first connecting cavity 33 and first side plates 34 located at both sides of the first connecting cavity 33, and the first rotating disc 32 can be movably connected inside the first connecting cavity 33 through a first connecting shaft 35. The second head 4 includes a second connecting cavity 43 and second side plates 44 located at both sides of the second connecting cavity 43, and the second rotating disk 42 is movably connected inside the second connecting cavity 43 through a second connecting shaft 45. Alternatively, at least one section of the first connecting shaft 35 is provided in a prismatic shape so as to cooperate with a prismatic hole between the first rotating disks 32 and not rotate relatively. Furthermore, a groove for accommodating a positioning gasket is provided at an end of the first connecting shaft 35, and the first rotating disk 32 is fixed in an axial direction by the gasket. The same is applied to the second connecting shaft 45. Alternatively, a length of the prismatic section is larger than a depth of the prismatic hole.

Figure 9:
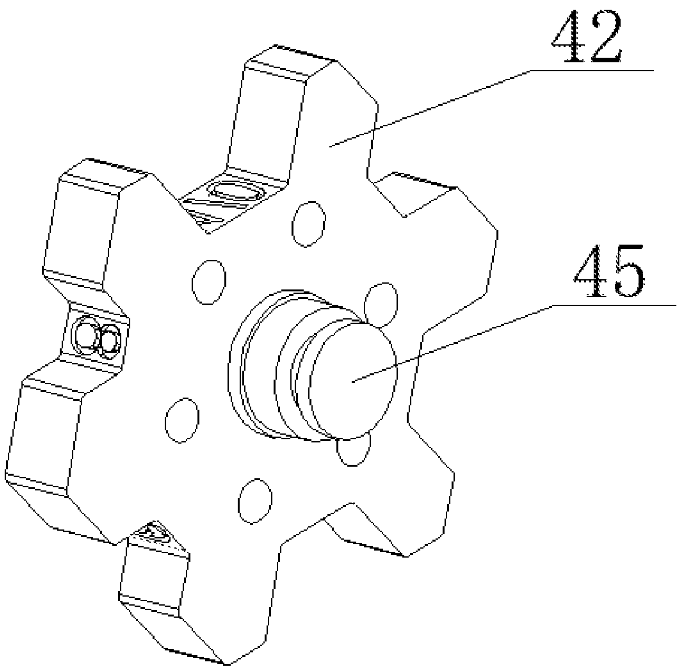
FIG. 9 is a schematic view showing cooperation between a first connecting shaft and a first rotating disk according to an embodiment of the present disclosure.
Figure 10:
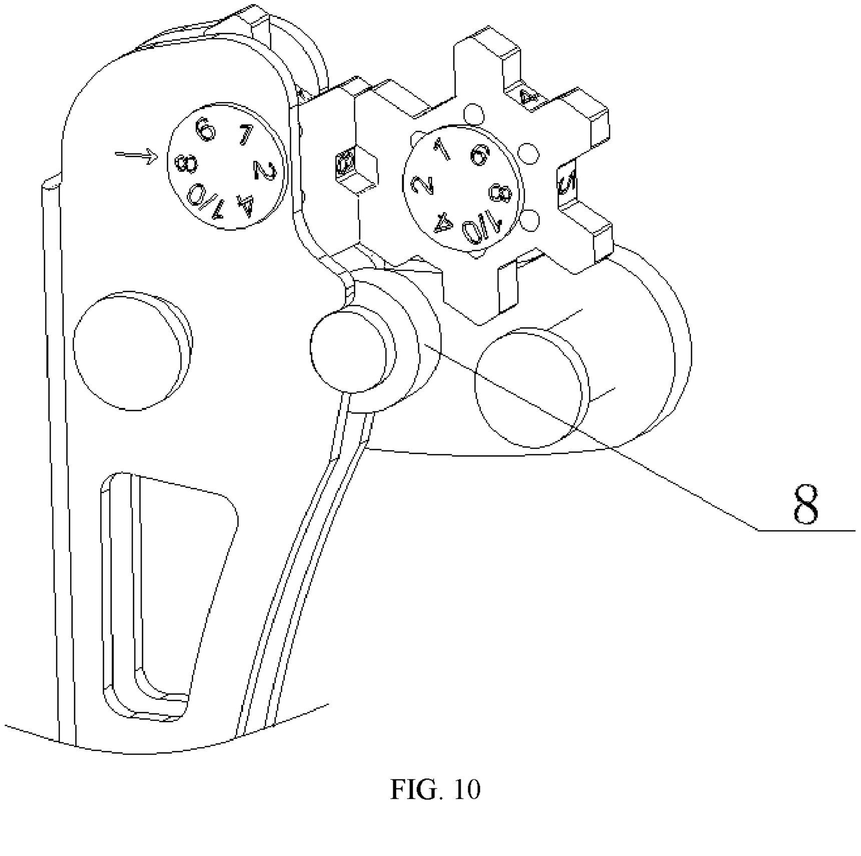
FIG. 10 is a schematic view showing cooperation between a rotating shaft and a support ring according to an embodiment of the present disclosure.

In other embodiments, the groove and the positioning gasket may not be provided for the connecting shaft and the rotating disk, but the first connecting shaft 35 is directly riveted to the first rotating disk 32 and the second connecting shaft 45 is directly riveted to the second rotating disk 42. In another alternative embodiment, as shown in FIG. 9, the first connecting shaft 35 and the first rotating disk 32, as well as the second connecting shaft 45 and the second rotating disk 42, can also be directly integrally formed without providing the prismatic section and the prismatic hole. In other embodiments, the connecting shaft and the rotating disk can be connected in other connection methods, if with no relative rotation.

Alternatively, a gap is remained between the first rotating disk 32 and the first side plate 34, and a gap is remained between the second rotating disk 42 and the second side plate 44.

In the above embodiment, the first rotating disc 32 is located in the first connecting cavity 33 and the second rotating disc 42 is located in the second connecting cavity 43, which ensures stability of the first rotating disc 32 and the second rotating disc 42 in adjusting.

In this embodiment, as shown in FIG. 4, the first connecting shaft 35 can penetrate through the first side plates 34, a first indication mark 351 is provided at an end face of the first connecting shaft 35, and the first side plates 34 can be provided with first size marks 341 which can be distributed around the first connecting shaft 35. The second connecting shaft 45 can penetrate through the second side plates 44, a second indication mark 451 is provided at an end face of the second connecting shaft 45, and the second side plate 44 can be provided with second size marks 441 which can be distributed around the second connecting shaft 45.

Figure 8:
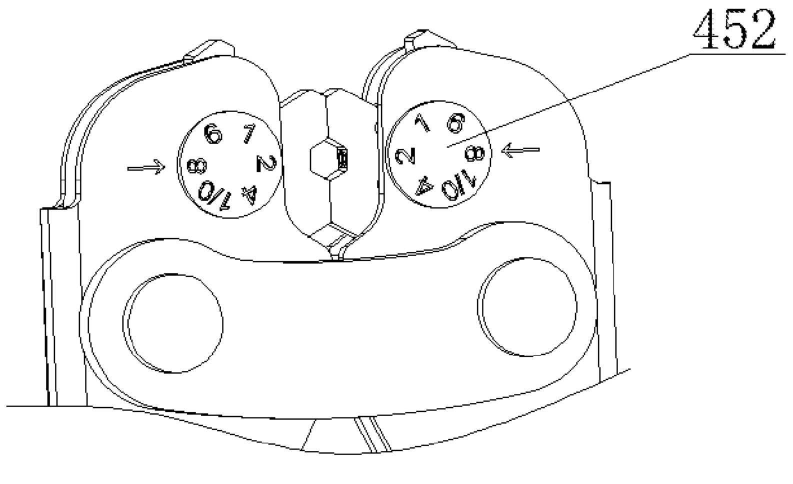
FIG. 8 is a schematic view of another size mark and indication mark according to an embodiment of the present disclosure.

Alternatively, as shown in FIG. 8, the first size marks 341 may be provided at the end face of the first connecting shaft 35 and the first indication mark 351 may be provided on the first side plates 34, and the second size marks may be provided at the end face of the second connecting shaft and the second indication mark may be provided on the second side plates 44, which means that positions of the size marks and the indication mark can be exchanged. Alternatively, in order to make the size marks more obvious, a flange 452 can be provided at the end face of the first connecting shaft 35 or the second connecting shaft 45 so as to provide a large area for identification. In the above embodiment, the first indication mark 351 and the second indication mark 451 can be in a form of an arrow, dot or the like, and the first size marks 341 and the second size marks 441 indicate a size of a corresponding crimping terminal.

Figure 5:
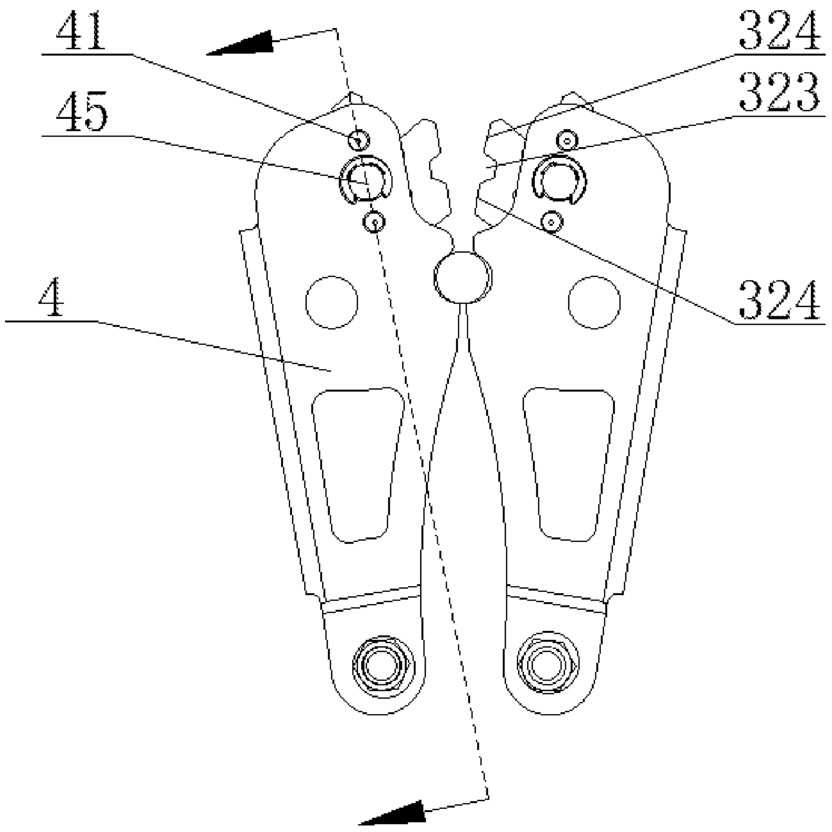
FIG. 5 is a rear view of a head of an electrician plier according to an embodiment of the disclosure.
Figure 6:
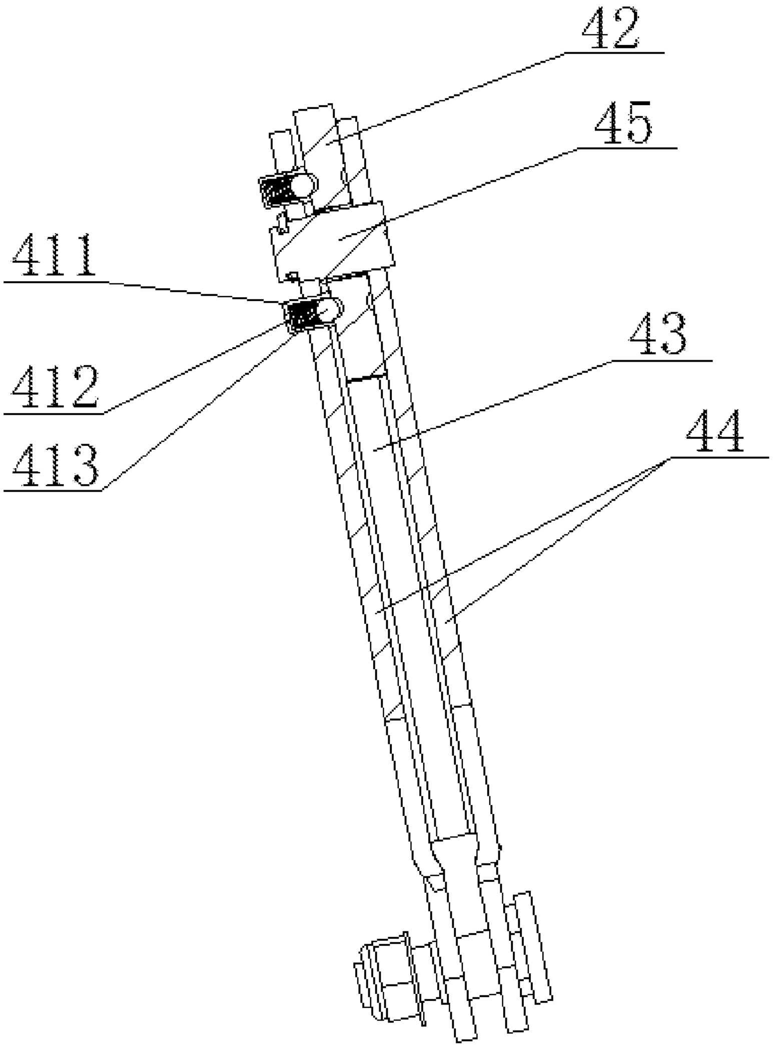
FIG. 6 is a sectional view along a line A-A in FIG. 5.
Figure 7:
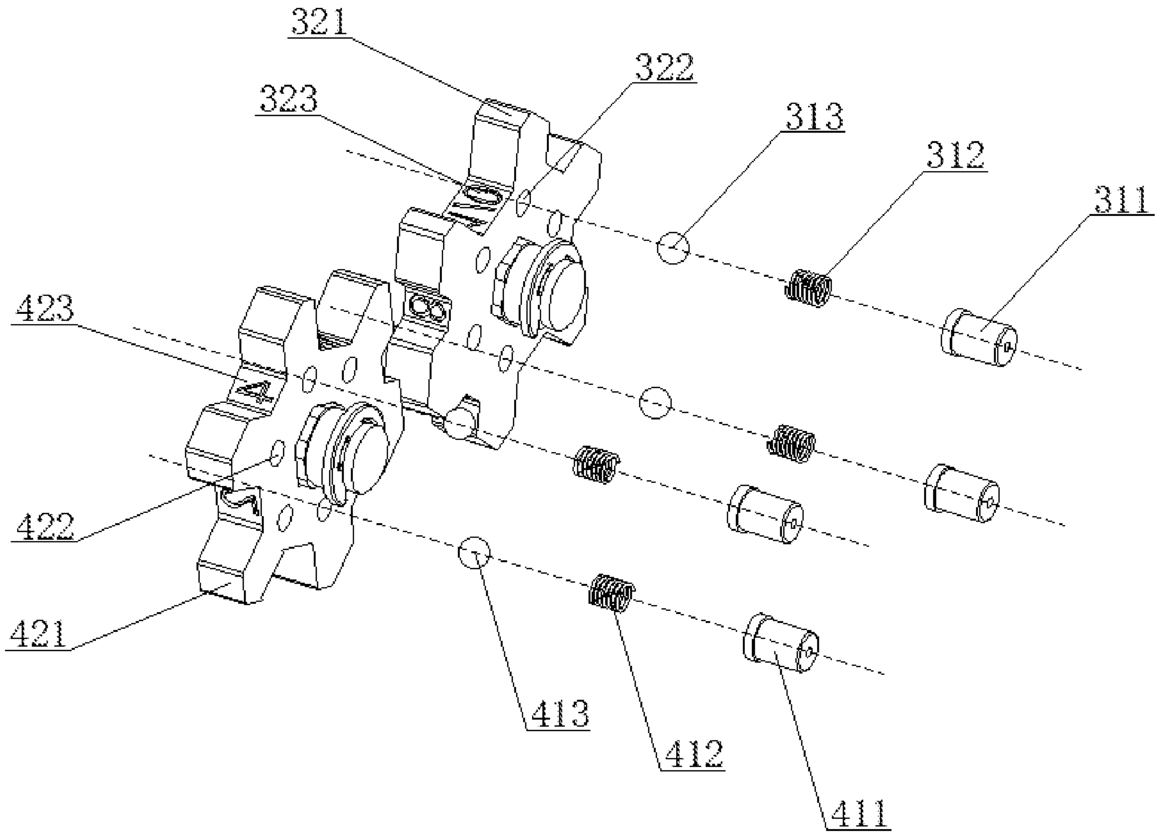
FIG. 7 is an exploded view of a rotating disc and a positioning member according to an embodiment of the disclosure.

In this embodiment, as shown in FIGS. 5 to 7, the first positioning member 31 includes a first positioning cap 311, a first return spring 312 and a first top bead 313, the first positioning cap 311 is connected to the first side plates 34, the first return spring 312 can be located in the first positioning cap 311, one end of the first return spring 312 can be abutted against the first positioning cap 311, the other end of the first return spring 312 can be abutted against the first top bead 313, and the first top bead 313 can be connected in the first positioning holes 322. The second positioning member 41 includes a second positioning cap 411, a second return spring 412 and a second top bead 413, the second positioning cap 411 can be connected to the second side plates 44, the second return spring 412 can be located in the second positioning cap 411, one end of the second return spring 412 can be abutted against the second positioning cap 411, the other end of the second return spring 412 can be abutted against the second top bead 413, and the second top bead 413 can be connected in the second positioning holes 422. In the above embodiment, the first positioning cap 311 and the second positioning cap 411 are respectively clamped on the first side plates 34 and the second side plates 44 in a form of a boss structure. The first positioning member 31 and the second positioning member 41 with a structure described above are easy to assemble and can support direct adjustment of the first rotating disk 32 and the second rotating disk 42.

In this embodiment, the fixing plates 5 is located at both sides of the first head 3 and the second head 4, and the first head 3 is provided with a first fixing post 36, and the second head 4 can be provided with a second fixing post 46, and the first fixing post 36 and the second fixing post 46 can respectively penetrate through the fixing plates 5. Alternatively, a protrusion is provided at one end of the first fixing post 36 so as to be engaged with one of the fixing plates, and a groove is provided at the other end of the first fixing post 36 so as to be engaged with another of the fixing plates for fixation. The same is applied to the second fixing post.

In this embodiment, a side of the first head 3 proximate to the rotating shaft 6 is provided with a first arc groove 37, and a side of the second head 4 proximate to the rotating shaft 6 is provided with a second arc groove 47, and the rotating shaft 6 can be attached to the first arc groove 37 and the second arc groove 47 respectively, and the rotating shaft 6 can be located between the fixing plates 5. A support ring 8 is sleeved on a periphery of the rotating shaft 6, and two ends of the support ring are respectively abutted against two first side plates and two second side plates for supporting the two first side plates and the two second side plates, and a distance between the two first side plates and a distance between the two second side plates can be simultaneously controlled. An axial length of the support ring is smaller than an axial length of the rotating shaft.

In the above embodiment, during action of the electrician plier, the first head 3 and the second head 4 are engaged and disengaged around the rotating shaft 6.

In this embodiment, each of the plurality of first crimping grooves 323 is arranged between adjacent first crimping teeth 321, and sizes of the plurality of first crimping grooves 323 are different from each other. Each of the plurality of second crimping grooves 423 is arranged between adjacent second crimping teeth 421, and sizes of the plurality of second crimping grooves 423 are different from each other. The plurality of first crimping grooves 323 are matched with the plurality of second crimping grooves 423 for crimping wires and wire fittings of connecting terminals. Each of the plurality of first crimping teeth 321 is provided with a mating end face 324 for positioning, which is used for fast positioning with a respective second crimping tooth, and correspondingly, each of the plurality of second crimping teeth is also provided with a mating end face.

In the above embodiment, as shown in FIG. 7, there are six first crimping grooves 323 of the first rotating disk 32, and sizes of respective first crimping grooves 323 are different; and there are six second crimping grooves 423 of the second rotating disk 42, and sizes of respective second crimping grooves 423 are different. The first crimping grooves 323 and the second crimping grooves 423 are arranged in pair. In other implementations, shapes of respective first or second crimping grooves can also be different.

Figure 11:
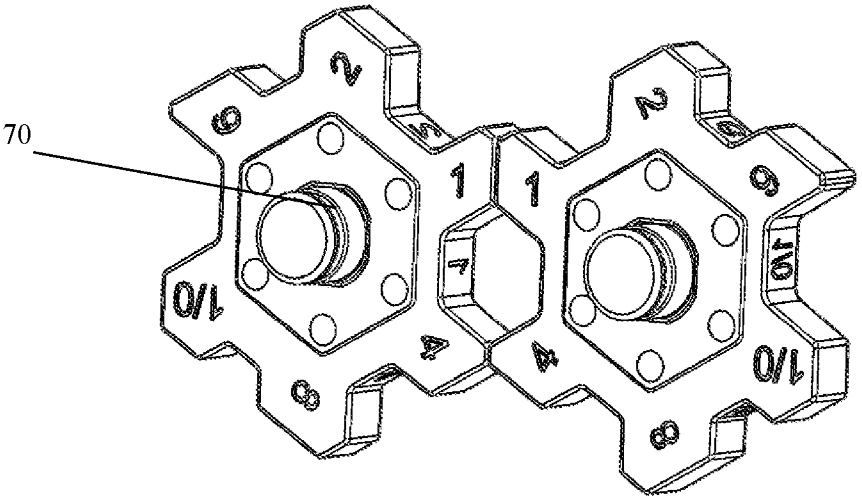
FIG. 11 is a first schematic view of a rotating disk according to an embodiment of the present disclosure.
Figure 12:
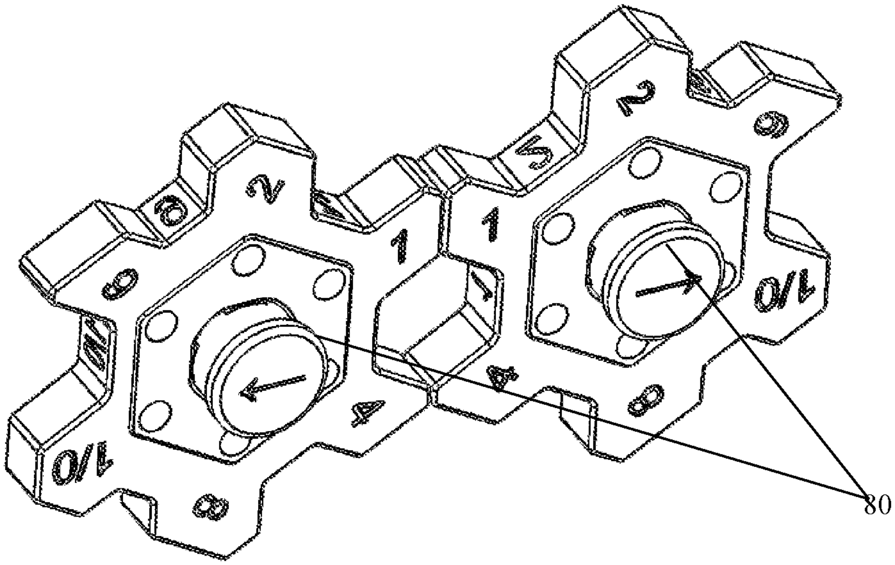
FIG. 12 is a second schematic view of a rotating disk according to an embodiment of the present disclosure.

In other embodiments, the first size marks 341, the first indication mark 351, the second size marks 441 and the second indication mark 451 may not be provided, and corresponding size marks may be provided only on an inner wall of the first crimping groove 323 or the second crimping groove 423, or on a side surface of the first crimping tooth 321 or the second crimping tooth 421. Alternatively, as shown in FIG. 11 and FIG. 12, the size marks may be provided on opposite sides of the first crimping tooth 321 or the second crimping tooth 421, or size marks may be provided only on one side of the first crimping tooth 321 or the second crimping tooth 421.

The plurality of first positioning holes 322, the plurality of first crimping grooves 323 and the plurality of first crimping teeth 321 are circumferentially arranged on the first rotating disk 32 with the first connecting shaft 35 as a center, and the plurality of second positioning holes 422, the plurality of second crimping grooves 423 and the plurality of second crimping teeth 421 are circumferentially arranged on the second rotating disk 42 with the second connecting shaft 45 as a center.

In this embodiment, the first handle 1 is movably connected with the first head 3 through a first eccentric shaft 11, and the second handle 2 is movably connected with the second head 4 through a second eccentric shaft 21.

In the above embodiment, the electrician plier may be worn for a long time, so the first handle 1 and the first head 3 are connected by the first eccentric shaft 11, and the second handle 2 and the second head 4 are connected by the second eccentric shaft 21. When there is certain wearing, the first eccentric shaft 11 and the second eccentric shaft 21 can be adjusted to adjust a relative distance between the first rotating disc 32 and the second rotating disc 42.

In this embodiment, there is at least one group of first positioning members 31 provided, and there is at least one group of second positioning members 41 provided. As shown in FIG. 7, there are two groups of first positioning members 31 and two groups of second positioning members 41 provided. The two groups of first positioning members 31 are respectively arranged on both sides of the first connecting shaft and the two groups of second positioning members are respectively arranged on both sides of the second connecting shaft, which requires that the first positioning holes 322 and the second positioning holes 422 are evenly distributed. In other embodiments, there are only one group of the first positioning members and one group of the second positioning members provided.

In this embodiment, the first handle 1 and the second handle 2 are movably connected through a pin shaft 7.

For the electrician plier according to the technical scheme of the disclosure, a crimping size of a connecting terminal can be adjusted by: acquiring a crimping position of the terminal, directly shifting the first crimping teeth 321 of the first rotating disk 32 and the second crimping teeth 421 of the second rotating disk 42, or directly rotating an end of the first connecting shaft or the second connecting shaft (for convenience of shifting, the shifting end of the first connecting shaft or the second connecting shaft can be arranged to be raised from the first side plate or the second side plate, or the shifting end of the first connecting shaft or the second connecting shaft can be provided with a pattern which facilitates shifting, or the shifting end of the first connecting shaft or the second connecting shaft can be enlarged), and adjusting the crimping size to a required size according to the first size marks 341 indicated by the first indication mark 351 on the first connecting shaft 35 and the second size marks 441 indicated by the second indication mark 451 on the second connecting shaft 45. After the adjusting is completed, the wire core and the connecting terminal can be directly placed into a crimping port, and then the first handle 1 and the second handle 2 are closed, followed by actions of the first head 3 and the second head 4, and thus the first rotating disc 32 and the second rotating disc 42 are closed together to complete a crimping action. For the electrician plier according to the disclosure, the crimping size of the head can be simply and quickly adjusted, so as to improve convenience and flexibility in using the head.

Alternatively, as shown in FIG. 11 and FIG. 12, schematic views of the rotating disk in different directions are shown respectively. A groove 70 for accommodating a C-shaped gasket is provided at one end of each of the first connecting shaft 35 and the second connecting shaft 45, and an end cap 80 is provided at the other end of each of the first connecting shaft 35 and the second connecting shaft 45, and a diameter of the end cap is larger than those of the first connecting shaft 35 and the second connecting shaft 45 so as to function in shielding.

The present disclosure and embodiments thereof are described above in an illustrative manner, which is not restrictive; and what is shown in the drawings is only one of the embodiments of the present disclosure, and its actual structure is not limited thereto. Therefore, structures and embodiments similar to the technical scheme designed by those of ordinary skilled in the art inspired by this disclosure without creativity, without departing from the creative purpose of the present disclosure, are all within a protection scope of the present disclosure.

What is claimed is:

1. An electrician plier for crimping terminals connection, the electrician plier comprising:

a first handle and a second handle, wherein the first handle and second handle are pivotally hinged with each other, and the first handle is movably connected to a first head, the second handle is movably connected to a second head, the first head and the second head are sandwiched and clamped between fixed plates, and a rotating shaft is connectively arranged between the first head and the second head so that the first head and the second head are formally displaced around the rotating shaft;

the first head comprises a first positioning member and a first rotating disc, and the first rotating disc is movably connected to the first head, a plurality of first crimping teeth and a plurality of first crimping grooves are provided at a periphery of the first rotating disc, a plurality of first positioning holes are circumferentially formed on the first rotating disc, and the first positioning member is matched and connected with the plurality of first positioning holes respectively;

the second head comprises a second positioning member and a second rotating disc, and the second rotating disc is movably connected to the second head, and a plurality of second crimping teeth and a plurality of second crimping teeth grooves are provided at a periphery of the second rotating disc, and a plurality of second positioning holes are circumferentially formed on the second rotating disc, and the second positioning member is matched and connected with the plurality of second positioning holes respectively; and the first rotating disk is arranged opposite to the second rotating disk.

2. The electrician plier according to claim 1, wherein the first head comprises a first connecting cavity and first side plates located at both sides of the first connecting cavity, and the first rotating disc is movably connected inside the first connecting cavity through a first connecting shaft; and the second head comprises a second connecting cavity and second side plates located at both sides of the second connecting cavity, and the second rotating disk is movably connected inside the second connecting cavity through a second connecting shaft.

3. The electrician plier according to claim 2, wherein the first connecting shaft penetrates through the first side plates, a first indication mark is provided at an end face of the first connecting shaft and first size marks which are distributed around the first connecting shaft are provided on the first side plates; and the second connecting shaft penetrates through the second side plates, a second indication mark is provided at an end face of the second connecting shaft and second size marks which are distributed around the second connecting shaft are provided on the second side plates.

4. The electrician plier according to claim 2, wherein the first positioning member comprises a first positioning cap, a first return spring and a first top bead, the first positioning cap being connected to the first side plates, the first return spring being located in the first positioning cap, one end of the first return spring being abutted against the first positioning cap, the other end of the first return spring being abutted against the first top bead, and the first top bead being connected in one or more of the first positioning holes; and the second positioning member comprises a second positioning cap, a second return spring and a second top bead, the second positioning cap being connected to the second side plates, the second return spring being located in the second positioning cap, one end of the second return spring being abutted against the second positioning cap, the other end of the second return spring being abutted against the second top bead, and the second top bead being connected in one or more of the second positioning holes.

5. The electrician plier according to claim 2, wherein an end cap is provided at an end of each of the first connecting shaft and the second connecting shaft, and a diameter of the end cap is larger than those of the first connecting shaft and the second connecting shaft so as to function in shielding.

6. The electrician plier according to claim 1, wherein the fixing plates are located at both sides of the first head and the second head, and the first head is provided with a first fixing post and the second head is provided with a second fixing post, the first fixing post and the second fixing post respectively penetrating through the fixing plates.

7. The electrician plier according to claim 1, wherein a first arc groove is provided at a side of the first head proximate to the rotating shaft and a second arc groove is provided at a side of the second head proximate to the rotating shaft, and the rotating shaft is attached to the first arc groove and the second arc groove respectively, and the rotating shaft is located between the fixing plates.

8. The electrician plier according to claim 1, wherein each of the plurality of first crimping grooves is arranged between adjacent first crimping teeth, and sizes or shapes of the plurality of first crimping grooves are different from each other; and each of the plurality of second crimping grooves is arranged between adjacent second crimping teeth, and sizes or shapes of the plurality of second crimping grooves are different from each other.

9. The electrician plier according to claim 1, wherein the first handle is movably connected with the first head through a first eccentric shaft, and the second handle is movably connected with the second head through a second eccentric shaft.

10. The electrician plier according to claim 1, wherein there is at least one group of first positioning members provided, and there is at least one group of second positioning members provided.

11. The electrician plier according to claim 1, wherein the first handle and the second handle are movably connected through a pin shaft.

* * * * *